United States Patent
Cain et al.

(10) Patent No.: US 7,794,773 B2
(45) Date of Patent: **\*Sep. 14, 2010**

(54) FRYING FATS AND OILS

(75) Inventors: Frederick William Cain, Wormerveer (NL); Harold Kazier, Channahon, IL (US); Gerald Patrick McNeill, Channahon, IL (US)

(73) Assignee: Loders Croklaan USA LLC, Channahon, IL (US)

( * ) Notice: Subject to any disclaimer, the term of this patent is extended or adjusted under 35 U.S.C. 154(b) by 417 days.

This patent is subject to a terminal disclaimer.

(21) Appl. No.: 11/725,477

(22) Filed: Mar. 20, 2007

(65) Prior Publication Data

US 2007/0207250 A1 Sep. 6, 2007

Related U.S. Application Data

(63) Continuation of application No. 10/986,044, filed on Nov. 12, 2004.

(51) Int. Cl.
*A23D 9/00* (2006.01)

(52) U.S. Cl. .................. 426/606; 426/601; 426/607
(58) Field of Classification Search ............ 426/606, 426/607, 601
See application file for complete search history.

(56) References Cited

U.S. PATENT DOCUMENTS

| | | | | |
|---|---|---|---|---|
| 5,578,334 | A | 11/1996 | Sundram et al. | 426/2 |
| 5,874,117 | A | 2/1999 | Sundram et al. | 426/2 |
| 6,165,518 | A | 12/2000 | Cain et al. | 426/74 |
| 7,611,744 | B2 * | 11/2009 | Cain et al. | 426/606 |
| 2005/0276900 | A1 * | 12/2005 | Ullanoormadam | 426/601 |

FOREIGN PATENT DOCUMENTS

| | | |
|---|---|---|
| EP | 0 081 881 A2 | 6/1983 |
| EP | 0 797 921 A2 | 10/1997 |
| JP | A-02214799 | 8/1990 |
| JP | A-06113741 | 4/1994 |
| JP | A-09322708 | 12/1997 |
| JP | A-2000125765 | 5/2000 |

OTHER PUBLICATIONS

Ghosh, S. 1997. JAOCS 74(5)589-592.*
Deffense, E., "Dry multiple fractionation: trends in products and applications", Lipid Technology, Mar. 1995, pp. 34-38.
Hui, Y.H., editor, 1996, Bailey's Industrial Oil and Fat Products, 5th Edition, vol. 2, John Wiley & Sons, Inc., New York, pp. 278-280, 341.
Duns, M.L., "Palm Oil Margarines and Shortenings", JAOCS, 62(2):408-410 (Feb. 1985).
Kheiri, M.S.A., "Palm Oil Products in Cooking Fats", JAOCS, 62(2):410-416 (Feb. 1985).

* cited by examiner

*Primary Examiner*—Carolyn A Paden
(74) *Attorney, Agent, or Firm*—Morgan Lewis & Bockius LLP

(57) ABSTRACT

Compositions suitable for use as a frying fat or oil may be derived from palm oil by a process comprising interesterification and comprise triglycerides. The compositions may have a content of saturated fatty acids having from 12 to 24 carbon atoms (SAFA) of at least 53% by weight, and a content of unsaturated fatty acids having 18 carbon atoms of less than 47% by weight. The compositions may be used to prepare fried foods such as donuts.

9 Claims, No Drawings

FRYING FATS AND OILS

This is a continuation of U.S. application Ser. No. 10/986,044, filed Nov. 12, 2004.

This invention relates to compositions suitable for use as a frying fat or oil, to a method of producing a fried food and to a food product which has been fried in a composition.

A number of food products are prepared by a process which comprises the step of frying in a hot fat or oil. The resulting food products may be eaten hot or cold.

Palm oil is a semi-solid fat used in various applications, including in foodstuffs. Palm oil is typically fractionated into a lower melting olein fraction and a higher melting stearin fraction.

EP-A-0081881 describes a process for the solvent fractionation of palm oil stearins. The liquid fraction can be used as a cooking oil. The fraction contains less than 50% saturated fatty acids (see Table F).

JP 09322708 discloses an oil and fat for frying donuts. The composition is a blend of unfractionated palm oil with vegetable oil. The inventors believe that such a blend will have a saturated fatty acid content of less than 50%.

JP-A-2000125765 describes an oil and fat composition comprising a blend of palm oil fractions.

JP-A-02214799 describes the production of refined palm oil for use in frying.

JP-A-06113741 discloses an oil or fat for frying which is a blend of a palm fraction with a hardened oil. The composition is described as suppressing mold-like whitening of a fried product on storage.

EP-A-0797921 discloses a frying fat or oil derived from palm oil or a mixture of palm oil with a liquid vegetable oil. The composition has a saturated fatty acid content of 25 to 48% by weight.

There remains a need for frying fats or oils that show a reduced tendency to oil out from the fried food product and that are less waxy.

According to the invention in a first aspect, there is provided a composition suitable for use as a frying fat or oil which is derived from palm oil and which comprises triglycerides,
said composition having a content of saturated fatty acids having from 12 to 24 carbon atoms of at least 53% by weight, and a content of unsaturated fatty acids having 18 carbon atoms of less than 47% by weight, said percentages being based on total fatty acids in the triglycerides,
wherein said composition has a content of SSS triglycerides of from 10% to 25% by weight, a content of $S_2U$ triglycerides of from 40% to 70% by weight and a content of $SU_2$ triglycerides of from 10% to 40% by weight, said percentages being based on total triglycerides, wherein S is a fatty acid having from 12 to 24 carbon atoms and U is an unsaturated fatty acid having 12 to 24 carbon atoms.

In a second aspect, the invention provides a composition suitable for use as a frying fat or oil which is derived from palm oil by a process comprising interesterification and which comprises triglycerides, said composition having a content of saturated fatty acids having from 12 to 24 carbon atoms (SAFA) of at least 60% by weight, and a content of unsaturated fatty acids having 18 carbon atoms of less than 40% by weight, wherein C18:2 cis fatty acids are present in an amount of between 1.0 and 7.5% by weight.

A third aspect of the invention is a composition suitable for use as a frying fat or oil which is derived from palm oil and which comprises triglycerides, said composition having a content of saturated fatty acids having from 12 to 24 carbon atoms (SAFA) of at least 60% by weight, and a content of unsaturated fatty acids having 18 carbon atoms of less than 40% by weight.

In a fourth aspect, the invention provides a method of producing a fried food which comprises frying uncooked food in a composition derived from palm oil and which comprises triglycerides,
said composition having a content of saturated fatty acids having from 12 to 24 carbon atoms of at least 53% by weight, and a content of unsaturated fatty acids having 18 carbon atoms of less than 47% by weight, said percentages being based on total fatty acids in the triglycerides,
wherein said composition has a content of SSS triglycerides of from 10% to 25% by weight, a content of $S_2U$ triglycerides of from 40% to 70% by weight and a content of $SU_2$ triglycerides of from 10% to 40% by weight, said percentages being based on total triglycerides, wherein S is a fatty acid having from 12 to 24 carbon atoms and U is an unsaturated fatty acid having 12 to 24 carbon atoms.

A fifth aspect of the invention is a method of producing a fried food which comprises frying uncooked food in a composition which is derived from palm oil and which comprises triglycerides, said composition having a content of saturated fatty acids having from 12 to 24 carbon atoms (SAFA) of at least 60% by weight, and a content of unsaturated fatty acids having 18 carbon atoms of less than 40% by weight.

In a sixth aspect, the invention provides a method of producing a donut which comprises frying the uncooked donut mixture in a composition which is derived from palm oil and which comprises triglycerides, said composition having a content of saturated fatty acids having from 12 to 24 carbon atoms (SAFA) of at least 53% by weight, and a content of unsaturated fatty acids having 18 carbon atoms of less than 47% by weight.

A further, seventh aspect of the invention is a food product which has been fried in a composition which is derived from palm oil and which comprises triglycerides,
said composition having a content of saturated fatty acids having from 12 to 24 carbon atoms of at least 53% by weight, and a content of unsaturated fatty acids having 18 carbon atoms of less than 47% by weight, said percentages being based on total fatty acids in the triglycerides,
wherein said composition has a content of SSS triglycerides of from 10% to 25% by weight, a content of $S_2U$ triglycerides of from 40% to 70% by weight and a content of $SU_2$ triglycerides of from 10% to 40% by weight, said percentages being based on total triglycerides, wherein S is a fatty acid having from 12 to 24 carbon atoms and U is an unsaturated fatty acid having 12 to 24 carbon atoms.

In an eighth aspect, the invention provides a food product which has been fried in a composition which is derived from palm oil and comprises triglycerides, said composition having a content of saturated fatty acids having from 12 to 24 carbon atoms (SAFA) of at least 60% by weight, and a content of unsaturated fatty acids having 18 carbon atoms of less than 40% by weight, wherein C18:2 cis fatty acids are present in an amount of between 1.0 and 7.5% by weight.

The invention also provides a composition which is derived from palm oil and which comprises triglycerides, said composition having a content of saturated fatty acids having from 12 to 24 carbon atoms of at least 53% by weight, and a content of unsaturated fatty acids having 18 carbon atoms of less than 47% by weight. Preferably, the composition is derived from palm oil by a process which comprises interesterification.

The terms "frying fat", "frying oil" and "frying fat or oil" are used interchangeably herein and refer to a composition that can be used for frying and is edible. The term fat typically refers to compositions that are solid at room temperature, whilst the term oil refers to compositions that are liquid at room temperature, but neither requirement is important in the context of the present invention. The compositions of the present invention typically comprise a mixture of solid fat and liquid oil at 20° C.

The compositions of the invention will typically be in the form of glycerides which are mono-, di- and tri-glycerides, preferably predominantly triglycerides. The fatty acid content of the composition is based on total fatty acids present in the composition, including those present as glyceride esters. This method of determining fatty acid content is standard in the art.

The compositions of the invention have surprisingly reduced oil out properties (i.e., a reduced tendency for the fat to separate from the fried food product and give the food product an oily feel and/or taste). Compositions of the invention are preferably derived from palm oil and are substantially or completely free of trans fatty acids, for example they may contain trans fatty acids in an amount of less than 2% by weight of the total fatty acids in the composition, more preferably less than 1.6%, such as less than 1%.

Compositions of the invention are preferably derived from palm oil by a method that comprises interesterification. Compositions of the invention are preferably obtained without the use of enzymes. However, interesterification of palm oil may be carried out chemically or enzymatically. Suitable techniques are well-known in the art.

Food products fried in the compositions of the invention have surprisingly good oral properties and tend not to have a waxy mouthfeel.

Compositions of the invention may be single fats or blends of two or more different fats. For example, the compositions may be obtained by the interesterification of palm oil with a liquid oil or by blending the product of such an interesterified mixture with one or more liquid oils. Similarly, one or more interesterified mixtures may be blended with a single liquid oil. Alternatively, two or more non-interesterified palm fractions may be blended.

Those skilled in the art are able to conduct suitable interesterifications and to make suitable blends of fats to arrive at a composition that is suitable for use as a composition of the invention.

In some embodiments, the compositions of the invention are obtainable or are obtained from palm oil. The term "palm oil" in this context refers not only to palm oil itself but also to fractions of palm oil, such as palm olein, palm stearin and fractions thereof. Preferred compositions of the invention comprise at least one interesterified palm component. The interesterified palm component may be mixed with one or more other palm components (which may or may not be interesterified) and, optionally, one or more other fats and/or oils. Preferred components of compositions of the invention are: palm oil fractions, optionally interesterified, having iodine values (IV) of about 45 to 65 (e.g., about 55); palm oil stearin, optionally interesterified, having an IV of 30 to 40 (e.g., about 35); and enriched palm oil obtained as a mid-fraction by dry fractionation.

In the present invention, the compositions may be derived from palm oil by a process comprising interesterification. The process may comprise other steps, such as fractionation and blending with other oils. Transesterification represents one of the possible steps in the process.

Preferably, the content of saturated fatty acids having from 12 to 24 carbon atoms in the compositions of the invention is at least 55% by weight, more preferably at least 56% by weight, even more preferably at least 57% by weight, such as at least 58% by weight, at least 59% by weight or at least 60% by weight. Preferred saturated fatty acids include C14:0 (myristic acid), C16:0 (palmitic acid), and C18:0 (stearic acid). Other fatty acids such as C12:0 (lauric acid) and fatty acids having fewer than 12 carbon atoms or greater than 24 carbon atoms may also be present. Typically, the total amount of C14:0, C16:0 and C18:0 fatty acids will represent at least 57% of the total fatty acid content.

The unsaturated fatty acids having 18 carbon atoms in the invention are preferably selected from C18:1 cis fatty acids, C18:2 cis fatty acids and mixtures thereof. Oleic and linoleic acids are preferred examples of such fatty acids. Other unsaturated fatty acids may also be present. The content of unsaturated fatty acids is preferably less than 45% by weight, more preferably less than 44% by weight, even more preferably less than 43% by weight, such as less than 42% by weight, less than 41% by weight or less than 40% by weight.

Preferably, the compositions comprise C18:2 cis fatty acids in an amount of less than 9.0% by weight, more preferably less than 8.0% by weight, even more preferably between 1.0 and 7.5% by weight, such as between 5.0% and 7.5% by weight.

The compositions of the invention preferably comprise C16:0 fatty acids (palmitic acid) in an amount of greater than 45% by weight, preferably greater than 46% by weight, more preferably greater than 47% by weight, even more preferably greater than 48% by weight, such as greater than 49% by weight or greater than 50% by weight.

Compositions of the invention may have a SSS content of from 10% to 25%, a $S_2U$ content of from 40% to 70%, a $SU_2$ content of from 10% to 40%, and preferably, a UUU content of from 1% to 15%. Said percentages are by weight based on total triglycerides. Preferably, the SSS content is from 12% to 20%. Preferably, the $S_2U$ content is from 45% to 65%. Preferably, the $SU_2$ content is from 15% to 30%. It will be appreciated that the term $S_2U$ covers SSU and SUS triglycerides and the term $SU_2$ covers SUU and USU triglycerides. Unsaturated fatty acids U may contain one or more (preferably one or two) carbon-carbon double bonds.

Compositions of the invention may comprise two palm fats A and B, fat A having a SSU/SUS weight ratio of greater than 1.5 and fat B having a SSU/SUS weight ratio of less than 0.3 the total blend having a SUS level of between 5 and 60% by weight, more preferably from 22% to 55% by weight, most preferably from 25% to 50% by weight. S and U are as defined above.

Preferably, compositions of the invention have an N10 of at least 70, an N25 of at least 35 and an N30 of at least 25. The term Nx refers to solid fat content, measured by NMR pulse techniques on unstabilized fats. Unstabilized meaning that the fat was melted at 80° C., kept at 60° C. for 5 minutes, cooled to 0° C., kept at 0° C. for 1 hour and kept at measurement temperature for 30 minutes.

Compositions of the invention optionally comprise a liquid oil. Liquid oils are liquid at 20° C. and are typically vegetable oils. Particularly preferred liquid oils are corn oil, sunflower oil (particularly mid and/or high oleic sunflower oil), safflower oil, cottonseed oil and mixtures thereof. The amount of liquid oil in the compositions of the invention is preferably from 1% to 30%, more preferably 5% to 25%, such as 10% to 20%, said percentages being by weight of the total composition.

Compositions of the invention are preferably free or substantially free (i.e., contain less than 0.04% by weight of the composition) of fatty acid polyglycerol esters. Compositions of the invention are also preferably free or substantially free (i.e., contain less than 0.05% by weight of the composition) of fats or oils that have been hardened by hydrogenation.

The method of the invention may be applied to any food that is typically fried or may be fried. Typical food products comprise at least flour and water. Preferably, the food before frying is an uncooked or partially cooked donut. The food product of the invention is preferably a donut. The term donut is well known in the art and refers to a small circular cake, fried in hot fat, optionally with a hole in the middle and optionally filled with jam. The donut may be coated after frying, for example with sugar or with a coating of chocolate or a chocolate-like composition. Further applications may be applied to the coated donut, for example sugar strands.

It has unexpectedly been found that donuts fried using the fats of the invention may have the advantage, compared to donuts fried in conventional fats, that sugar can be more easily spread onto the surface of the donut without the sugar becoming sticky. Therefore, the method of producing a donut according to the invention preferably includes the further step of applying powdered sugar (such as granulated or caster sugar) to the fried donut.

Compositions of the invention may be used in the methods of the invention. Thus, in the method of the invention, the composition preferably comprises saturated fatty acids having from 12 to 24 carbon atoms (SAFA) in an amount of at least 60% by weight. Also, the composition preferably comprises unsaturated fatty acids having 18 carbon atoms in an amount of less than 40% by weight. C18:2 cis fatty acids are preferably present in an amount of between 1.0 and 7.5% by weight.

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

The following non-limiting examples illustrate the invention and do not limit its scope in any way. In the examples and throughout this specification, all percentages, parts and ratios are by weight unless indicated otherwise.

EXAMPLES

The following frying fats were formulated. Three fats (Examples 1 to 3) were frying fats according to the invention. Three fats (Reference Examples 1 to 3) were used for comparative purposes.

Example 1 is a blend of: 24% by weight palm oil fraction having an iodine value (IV) of 55; 6% by weight palm oil stearin having an IV of 35; 40% by weight interesterified palm oil stearin having an IV of 35; and 30% enriched midfraction obtained by dry fractionation of palm oil.

Example 2 is a blend of: 30% by weight interesterified palm oil fraction having an iodine value (IV) of 55; 40% by weight interesterified palm oil fraction having an IV of 35; and 30% enriched mid-fraction obtained by dry fractionation of palm oil.

Example 3 is a blend of 60% by weight enriched midfraction obtained by dry fractionation of palm oil and 40% by weight interesterified palm oil stearin having an IV of 35.

Reference Example 1 is a blend of 80% by weight of an interesterified palm oil fraction having an IV of 55 and 20% by weight of an interesterified palm oil fraction having an IV of 35.

Reference Example 2 is a blend of 78.4% by weight of an interesterified palm oil fraction having an IV of 55 and 19.6% by weight of an interesterified palm oil fraction having an IV of 35 and 2% by weight of palm oil stearin having an IV of 14.

Reference Example 3 is a blend of 77.6% by weight of an interesterified palm oil fraction having an IV of 55 and 19.4% by weight of an interesterified palm oil fraction having an IV of 35 and 3% by weight of palm oil stearin having an IV of 14.

The triglyceride content of the compositions of Examples 1 to 3, determined by calculation based on silver phase HPLC of the components is as shown in the following table.

|  | SSS | SUS | SSU | SUU | USU | UUU | TOTAL | SSU/SUS |
| --- | --- | --- | --- | --- | --- | --- | --- | --- |
| Pof IV = 55 | 0.6 | 45.3 | 5.3 | 41.1 | 0 | 7.9 | 100.2 | 0.12 |
| Pos IV = 35 | 34.5 | 37.1 | 6.8 | 18.4 | 0.1 | 3.1 | 100 | 0.18 |
| Ie Pos IV = 35 | 34 | 14 | 28.2 | 15.6 | 4.8 | 3.8 | 100.4 | 2.01 |
| enPo | 1.7 | 69.4 | 7.9 | 16.5 | 1.4 | 3.1 | 100 | 0.11 |
| Ie Pof IV = 55 | 9 | 11 | 22 | 28 | 14 | 17 | 101 | 2.00 |
| EXAMPLE 1. | | | | | | | | |
| 24% Pof IV = 55 | 0 | 11 | 1 | 10 | 0 | 2 | | 0.12 |
| 6% Pos IV = 35 | 2 | 2 | 0 | 1 | 0 | 0 | | 0.18 |
| 40% Ie Pos IV = 35 | 14 | 6 | 11 | 6 | 2 | 2 | | 2.01 |
| 30% enPo | 1 | 21 | 2 | 5 | 0 | 1 | | 0.11 |
| Total | 16 | 40 | 15 | 22 | 2 | 5 | 100.208 | 0.39 |
| EXAMPLE 2 | | | | | | | | |
| 30% Ie Pof IV = 55 | 3 | 3 | 7 | 8 | 4 | 5 | | 2.00 |
| 40% Ie Pos IV = 35 | 14 | 6 | 11 | 6 | 2 | 2 | | 2.01 |
| 30% enPo | 1 | 21 | 2 | 5 | 0 | 1 | | 0.11 |
| Total | 17 | 30 | 20 | 20 | 7 | 8 | 100.46 | 0.68 |

-continued

|  | SSS | SUS | SSU | SUU | USU | UUU | TOTAL | SSU/SUS |
|---|---|---|---|---|---|---|---|---|
| EXAMPLE 3 | | | | | | | | |
| 60% enPo | 1 | 42 | 5 | 10 | 1 | 2 | | 0.11 |
| 40% Ie Pos IV = 35 | 14 | 6 | 11 | 6 | 2 | 2 | | 2.01 |
| Total | 15 | 47 | 16 | 16 | 3 | 3 | 100.16 | 0.34 |

The fatty acid content of the compositions used in the examples, based on the total weight of fatty acids in the triglycerides, is shown in the following table:

|  | Example 1 | Example 2 | Example 3 | Reference Example 1 | Reference Example 2 | Reference Example 3 |
|---|---|---|---|---|---|---|
| C12:0 HIRES | 0.18 | 0.25 | 0.18 | 0.41 | 0.39 | 0.39 |
| C15:0 HIRES | 0.1 | 0.1 | 0.1 | 0.1 | 0 | 0.1 |
| C14:0 HIRES | 1.1 | 1.1 | 1 | 1.1 | 1.1 | 1.1 |
| C16:0 HIRES | 52.3 | 50.8 | 53.4 | 43.5 | 44.4 | 44.5 |
| C16:1C HIRES | 0.1 | 0.1 | 0.1 | 0.2 | 0.2 | 0.2 |
| C17:0 HIRES | 0.1 | 0.1 | 0.1 | 0.1 | 0.1 | 0.1 |
| C18:0 HIRES | 5.3 | 5.3 | 5.8 | 4.6 | 4.6 | 4.6 |
| C18:1T HIRES | 0.4 | 0.4 | 1.3 | 0.4 | 0.4 | 0.4 |
| C18:1C HIRES | 32.2 | 33.4 | 31.2 | 39 | 38.3 | 38.3 |
| C18:2T HIRES | 0.2 | 0.2 | 0.2 | 0.3 | 0.3 | 0.3 |
| C18:2C HIRES | 7.2 | 7.4 | 5.9 | 9.5 | 9.3 | 9.3 |
| C18:3T HIRES | 0.1 | 0 | 0 | 0.1 | 0.1 | 0.1 |
| C18:3C HIRES | 0.1 | 0.1 | 0.1 | 0.2 | 0.2 | 0.2 |
| TTrans HIRES | 0.7 | 0.7 | 1.5 | 0.7 | 0.8 | 0.7 |
| C20:0 HIRES | 0.4 | 0.4 | 0.4 | 0.4 | 0.4 | 0.4 |
| C20:1C HIRES | 0.1 | 0.1 | 0.1 | 0.1 | 0.1 | 0.1 |
| C22:0 HIRES | 0.1 | 0.1 | 0.1 | 0.1 | 0.1 | 0.1 |
| C24:0 HIRES | 0.1 | 0.1 | 0.1 | 0.1 | 0.1 | 0.1 |
| SAFA* % | 59.68 | 58.25 | 61.18 | 50.41 | 51.19 | 51.39 |

*total saturated fatty acid

The melting point and saturated fatty acid content (SFC) at various temperatures was determined. The results are given below.

|  | Example 1 | Example 2 | Example 3 | Ref Example 1 | Ref Example 2 | Ref Example 3 |
|---|---|---|---|---|---|---|
| Melt Point, deg C./F. | 47.5 C./ 117.5 F. | 47.8 C./ 118.0 F. | 43.7 C./ 110.7 F. | 46.4 C./ 115.5 F. | 47.4 C./ 117.3 F. | 47.7 C./ 117.9 F. |
| SFC @ 10° C. | 74.9 | 76.5 | 82.1 | 61.1 | 63.1 | 63.2 |
| SFC @ 20° C. | 57.9 | 57.9 | 66.5 | 41.4 | 43.77 | 44.5 |
| SFC @ 25° C. | 42.1 | 44.9 | 49.1 | 30.1 | 32.1 | 33.2 |
| SFC @ 30° C. | 27.7 | 31.2 | 29.7 | 20.8 | 23.3 | 24.1 |
| SFC @ 35° C. | 17.2 | 20.9 | 16.8 | 14.5 | 16.8 | 17.6 |
| SFC @ 40° C. | 10.4 | 13.2 | 8.2 | 10.2 | 11.6 | 12.5 |

Protocol for Donut Frying and Assessment

1. Donut Frying Shortenings were formulated (the six formulations are listed above as Examples 1 to 3 and Reference Examples 1 to 3).
2. A standard bakery shop cake type donut mix was secured and used for all the testing. The mix was prepared according to the instructions.
3. The donuts were deposited using a Belshaw Type B Cake Donut depositor. This a standard depositor used to deposit cake donuts in retail shops.
4. Donuts were deposited and fried at 375-378° F. (190-192° C.). First side 60 seconds/second side 55 seconds.
5. Donuts were cooled on rack at room temperature for 25 minutes.

6. Donuts were then transferred onto a paper towel and stored for 24 hours at various predetermined temperatures (Ambient, 20° C. and 25.5° C.)
7. After 24 hours the donuts were photographed and the amount of oil was visually noted on the towels.
8. Products that according to the invention (Examples 1 to 3) showed the least amount of oil off onto the towel.

The invention claimed is:

1. Fat composition which is derived from palm oil by a process comprising interesterification and which comprises triglycerides, said composition having a content of saturated fatty acids having from 12 to 24 carbon atoms of at least 60% by weight, and a content of unsaturated fatty acids having 18 carbon atoms of less than 40% by weight, wherein C18:2 cis fatty acids are present in an amount of between 1.0 and 7.5% by weight, wherein said composition comprises an interesterified palm oil stearin having an iodine value (IV) of 30 to 40 and a SSU/SUS weight ratio of greater than 1.5, and a non-interesterified enriched palm oil mid-fraction having a SSU/SUS weight ratio of less than 0.3.

2. Fat composition which is derived from palm oil and which comprises triglycerides, said composition having a content of saturated fatty acids having from 12 to 24 carbon atoms of at least 60% by weight, and a content of unsaturated fatty acids having 18 carbon atoms of less than 40% by weight, wherein said composition comprises a blend of an interesterified palm oil stearin having an iodine value (IV) of 30 to 40 and a SSU/SUS weight ratio of greater than 1.5, and a non-interesterified enriched palm oil mid-fraction having a SSU/SUS weight ratio of less than 0.3.

3. Coated food product comprising the fat composition of claim 1 or claim 2.

4. Fat compositions according to claim 1 or claim 2 which includes one or more further palm oil fractions having iodine values (IV) of about 45 to 65.

5. Fat compositions according to claim 4 wherein said further palm oil fractions are interesterified.

6. A method of producing a fat composition which is derived from palm oil by a process comprising interesterification and which comprises triglycerides, said method comprising blending an interesterified palm oil stearin having an iodine value (IV) of 30 to 40 and a SSU/SUS weight ratio of greater than 1.5, and a non-interesterified enriched palm oil mid-fraction having a SSU/SUS weight ratio of less than 0.3, said composition having a content of saturated fatty acids having from 12 to 24 carbon atoms of at least 60% by weight, and a content of unsaturated fatty acids having 18 carbon atoms of less than 40% by weight, wherein C18:2 cis fatty acids are present in an amount of between 1.0 and 7.5% by weight.

7. A method of producing a fat composition which is derived from palm oil and which comprises triglycerides, said method comprising blending an interesterified palm oil stearin having an iodine value (IV) of 30 to 40 and a SSU/SUS weight ratio of greater than 1.5, a non-interesterified enriched palm oil mid-fraction having a SSU/SUS weight ratio of less than 0.3, said composition having a content of saturated fatty acids having from 12 to 24 carbon atoms of at least 60% by weight, and a content of unsaturated fatty acids having 18 carbon atoms of less than 40% by weight.

8. A method according to claim 6 or claim 7, wherein said blending includes one or more further palm oil fractions having iodine values (IV) of about 45 to 65.

9. A method according to claim 8 wherein said further palm oil fractions are interesterified.

* * * * *